July 14, 1931.  W. A. FREDERICK  1,814,746
SLEEVE VALVE ENGINE
Filed April 16, 1927
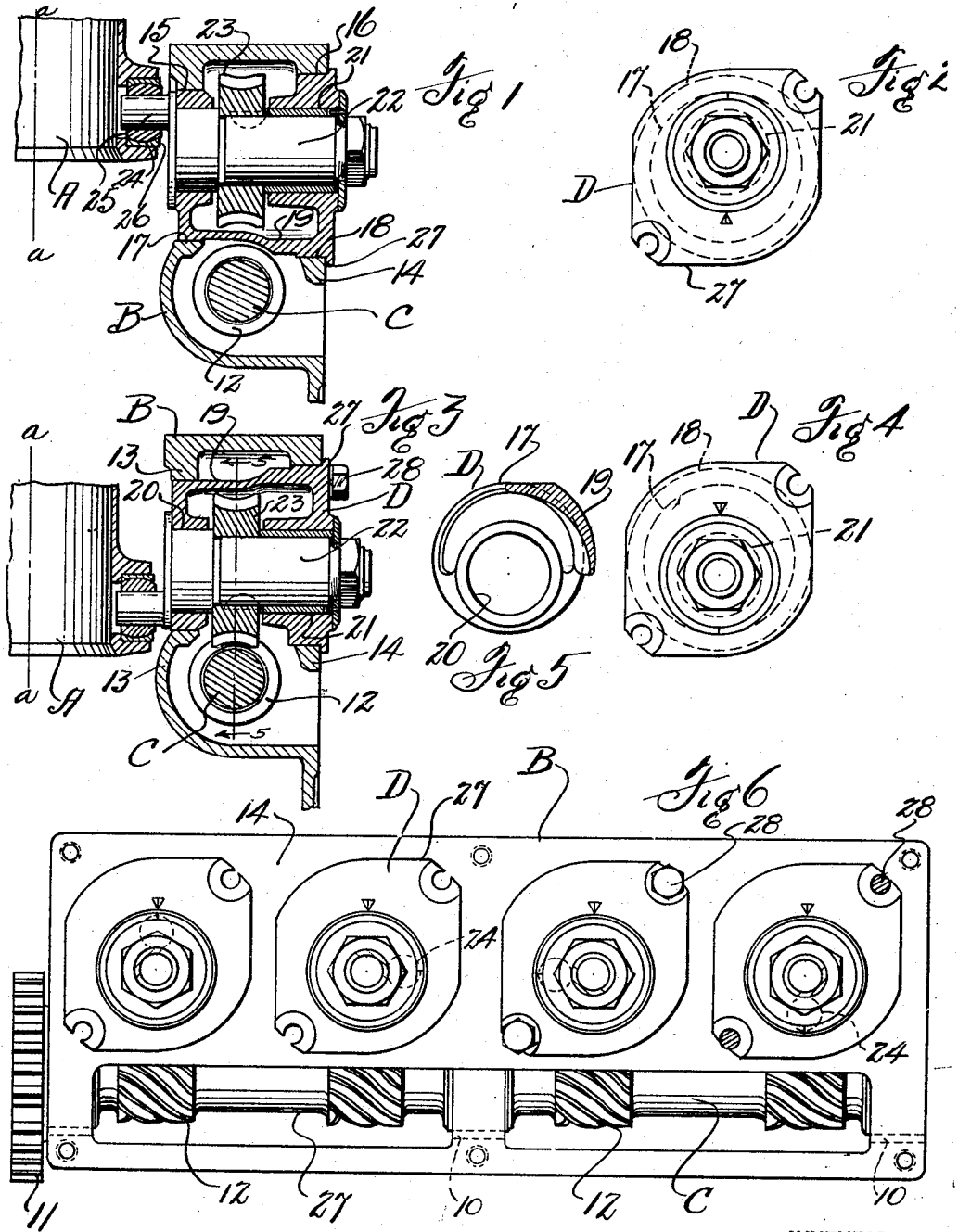
INVENTOR.
WALTER A. FREDERICK
BY
ATTORNEY.

Patented July 14, 1931

1,814,746

UNITED STATES PATENT OFFICE

WALTER A. FREDERICK, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE ENGINE

Application filed April 16, 1927. Serial No. 184,237.

This invention relates to internal combustion engines and refers more particularly to sleeve valve engines in which a single sleeve for each cylinder is given a combined oscillating and reciprocating movement with respect to the sleeve axis in controlling the intake and exhaust.

My invention relates particularly to the sleeve valve driving mechanism of the type embodying a valve driving layshaft extending longitudinally of the engine cylinders and carrying driving gears adapted to mesh with driving cross-shafts arranged transversely of the layshaft for driving connection with the sleeve valves respectively. One object of my invention resides in providing sleeve driving units which may be conveniently positioned for operation, including novel means for engaging the cross shaft gears with the respective lay shaft driving gears. Heretofore difficulty has been experienced in conveniently meshing these gears in assemblying the sleeve driving mechanism.

Further objects of my invention reside in the novel combination and arrangement of parts as will be apparent from the following description.

Referring to the accompanying drawings in which like reference characters indicate corresponding parts, Fig. 1 is a sectional elevation view showing the sleeve driving mechanism positioned for engagement with the layshaft driving gear, Fig. 2 is an elevation view of the eccentric bearing positioned as shown in Fig. 1, Figs. 3 and 4 are views corresponding with Figs. 1 and 2 respectively, the cross-shaft gear being positioned for engagement with the layshaft driving gear, Fig. 5 is an elevation view of the inner bearing for the cross-shaft along 5—5 in Fig. 3, the cross shaft being removed, and Fig. 6 is a side elevation view showing the driving mechanism for the sleeves of a plurality of cylinders.

Referring to the drawings reference character A represents the lower portion of a typical single sleeve valve, B the crank case casting, C the sleeve valve layshaft, and D the eccentric bearings for the sleeve driving cross-shafts.

The layshaft C is positioned for rotation in suitable bearings 10, and is driven as by gear 11 from the engine crankshaft (not shown) in proper timed relation therewith depending on the desired engine cycle as will be readily understood. The layshaft is provided with driving worms 12 at intervals along its length corresponding to the number of cylinders.

The casting B is conveniently formed with inner and outer spaced walls 13 and 14 respectively formed with concentric openings 15 and 16. Each of the eccentric bearing members D is formed with spaced bearings 17 and 18 respectively fitting within openings 15 and 16, these spaced bearings being preferably connected by a circumferential web segment or connecting means 19. The bearings 17, 18 have concentric bearings 20, 21 eccentrically disposed relative to bearings 17, 18. Rotatable in bearings 20, 21 is a sleeve cross-shaft 22 having fixed thereto the worm wheel 23. The inner end of the cross-shaft is provided with crank 24 suitably connected with sleeve A so as to impart to the sleeve the combined reciprocating and oscillating movement relative to the sleeve axis A—A. For this purpose the crank is ordinarily slidable in a ball 25 engageable in socket 26 of the sleeve.

The eccentric bearing D may be formed with an outer flange 27 adapted to contact with the side wall 14 of the casting B.

In assembling the sleeve drive mechanism the layshaft C is preferably first positioned in bearings 10 and the eccentric bearing units D with the shafts 22 and worm wheels 23 are inserted into openings 15, 16 to bring the flanges 27 against the wall 14, the bearing D being positioned substantially as shown in Figs. 1 and 2. In these figures it will be noted that by reason of the eccentric relation of shaft 22 with respect to bearings 15, 16, the worm wheel will clear the worm 12 permitting readily sliding the worm wheel transversely of the worm axis into a position ready for engagement with the worm upon a rotary motion of the eccentric bearing D. Thus with the parts arranged as in Figs. 1 and 2, the bearing D is rotated through 180° with the parts proportioned as shown, the worm wheel 23 being lowered by reason of the eccentric relationship, into operative engagement with the worm 12. In this latter position the bearing D may be held in place as by bolts 28 engaging registering bolt holes in the bearing flange 27 and wall 14.

The circumferential web 19 is so positioned as to rotate with the bearing D away from the worm 12 as the worm wheel lowers into engagement with the worm. In Fig. 5 the web 19 is shown at the end of this rotative travel in a clockwise direction for 180°, it being apparent that the web during this movement will not interfere with the lowering of the worm wheel.

It will be apparent that I have provided means for conveniently and quickly assembling the sleeve drive mechanism so that the clutching of the mechanism driven from the layshaft is effective upon movement of the eccentric bearing structure. Furthermore the gears are so arranged as to be free from interference during assembly of the driving mechanism, meshing of the gears being accompanied by rotary movement of the eccentric bearing structure.

Various modifications may be made to the embodiment of my invention which I have illustrated and I do not desire to limit my invention to the details illustrated apart from the appended claims.

What I claim as my invention is:

1. A sleeve valve driving mechanism comprising in combination; a sleeve valve; a layshaft; a driving worm carried by said layshaft; a driven cross shaft; a worm wheel carried by the cross shaft; a supporting frame having concentric spaced openings; an eccentric bearing member having concentric spaced portions respectively rotatable within the said concentric spaced frame openings; said eccentric member journalling the cross shaft eccentrically with respect to said concentric frame openings for moving the worm wheel into or out of engagement with the driving worm; said mechanism being constructed and arranged to permit the eccentric bearing member, cross shaft and worm wheel, to be moved as a unit longitudinally of the cross shaft axis into position within said frame openings with the layshaft and driving worm in operative position.

2. A sleeve valve driving mechanism comprising in combination; a sleeve valve; a layshaft; a driving worm carried by said layshaft; a driven cross shaft; a worm wheel carried by the cross shaft; a supporting frame having concentric shaped openings; an eccentric bearing member having concentric spaced portions respectively rotatable within the said concentric spaced frame openings; said eccentric member journalling the cross shaft eccentrically with respect to said concentric frame openings for moving the worm wheel into or out of engagement with the driving worm; said mechanism being constructed and arranged to permit the eccentric bearing member, cross shaft and worm wheel, to be moved as a unit longitudinally of the cross shaft axis into position within said frame openings with the layshaft and driving worm in operative position, and driving connections between the cross shaft and sleeve valve for imparting to the sleeve valve a combined reciprocating and oscillating movement.

3. A sleeve valve driving mechanism comprising in combination, a sleeve valve, a layshaft, a worm on the layshaft, a cross shaft transmitting the drive from the layshaft to the sleeve valve, a worm wheel on the cross shaft, a frame having spaced concentric openings, a carrier rotatable in said openings and eccentrically supporting the cross shaft, said frame openings permitting assembly of the carrier together with the cross shaft and worm wheel as a unit with the layshaft worm in operative position, said worm wheel on rotation of the assembled carrier being brought into engagement with the layshaft worm.

4. A sleeve valve driving mechanism comprising in combination, a sleeve valve, a layshaft, a worm on the layshaft, a frame having spaced concentric openings, a cross shaft transmitting the drive from the layshaft to the sleeve valve, a worm wheel mounted on the cross shaft for driving the cross shaft from the layshaft worm, a member rotatable within the frame openings eccentrically journalling the cross shaft for swinging the worm wheel selectively into or out of engagement with the layshaft worm, said frame openings being arranged to permit assembly or disassembly of said member with the layshaft worm in operative position by a movement of said member in the direction of its axis of rotation.

5. A sleeve valve driving mechanism comprising in combination, a sleeve valve, a layshaft, a worm on the layshaft, a frame having spaced concentric openings, a cross shaft transmitting the drive from the layshaft to the sleeve valve, a worm wheel mounted on the cross shaft for driving the cross shaft from the layshaft worm, a member rotatable within the frame openings eccentrically journalling the cross shaft for swinging the worm wheel selectively into or out of engagement with the layshaft worm, said frame openings being arranged to permit assembly or disassembly of said member with the layshaft worm in operative position by a movement of said member in the direction of its axis of rotation, one of said frame openings having a smaller diameter than the other.

6. A sleeve valve driving mechanism comprising in combination, a sleeve valve, a layshaft, a worm on the layshaft, a frame having spaced concentric openings, a cross shaft transmitting the drive from the layshaft to the sleeve valve, a worm wheel mounted on the cross shaft for driving the cross shaft from the layshaft worm, a member rotatable within the frame openings eccentrically journalling the cross shaft for swinging the worm wheel selectively into or out of engagement with the layshaft worm, said frame openings being arranged to permit assembly or disassembly of said member and worm wheel as a unit with the layshaft worm in operative position by a movement of said member in the direction of its axis of rotation.

7. A sleeve valve driving mechanism comprising in combination, a sleeve valve, a layshaft, a worm on the layshaft, a frame having spaced concentric openings, a cross shaft transmitting the drive from the layshaft to the sleeve valve, a worm wheel mounted on the cross shaft for driving the cross shaft from the layshaft worm, a member rotatable within the frame openings eccentrically journalling the cross shaft for swinging the worm wheel selectively into or out of engagement with the layshaft worm, said frame openings being arranged to permit assembly or disassembly of said member and worm wheel as a unit with the layshaft worm in operative position by a movement of said member in the direction of its axis of rotation, one of said openings having a smaller diameter than the other.

8. In a sleeve valve internal combustion engine the combination of a sleeve valve, a drive shaft, a driving worm gear on the drive shaft, a driven cross shaft transmitting the drive from the drive shaft to the sleeve valve, a driven worm gear on the driven shaft, a supporting structure, and means rotatably adjustable in the supporting structure for eccentrically swinging said driven worm gear selectively into or out of mesh with the driving worm gear, said means being insertable into position in the supporting structure longitudinally in the direction of the cross shaft axis after the driving worm gear is in its operative position.

In witness whereof, I hereunto subscribe my name this 14th day of April, A. D. 1927.

WALTER A. FREDERICK.